(12) United States Patent
Primrose et al.

(10) Patent No.: US 7,646,782 B1
(45) Date of Patent: Jan. 12, 2010

(54) DATA LINK/PHYSICAL LAYER PACKET BUFFERING AND FLUSHING

(76) Inventors: Donald R. Primrose, 16521 NW. Brandberry Dr., Portland, OR (US) 97229; I. Claude Denton, 6965 SW. 162$^{nd}$ Pl., Beaverton, OR (US) 97007

( * ) Notice: Subject to any disclaimer, the term of this patent is extended or adjusted under 35 U.S.C. 154(b) by 1940 days.

(21) Appl. No.: 09/918,931

(22) Filed: Jul. 30, 2001

(51) Int. Cl.
  *H04L 12/28* (2006.01)
(52) U.S. Cl. ...................................... 370/416; 370/418
(58) Field of Classification Search ......... 370/232–233, 370/236–236.1, 252, 395.71, 412, 422, 416–418
  See application file for complete search history.

(56) References Cited

U.S. PATENT DOCUMENTS

| | | | |
|---|---|---|---|
| 4,949,301 A | | 8/1990 | Joshi et al. |
| 5,133,062 A | | 7/1992 | Joshi et al. |
| 5,524,006 A | * | 6/1996 | Hluchyj et al. .............. 370/233 |
| 5,675,576 A | * | 10/1997 | Kalampoukas et al. ...... 370/232 |
| 5,732,087 A | * | 3/1998 | Lauer et al. ................. 370/416 |
| 5,764,641 A | * | 6/1998 | Lin ............................. 370/412 |
| 6,157,645 A | * | 12/2000 | Shobatake ............. 370/395.41 |
| 6,233,256 B1 | | 5/2001 | Dieterich et al. |
| 6,256,308 B1 | * | 7/2001 | Carlsson ................ 370/395.43 |
| 6,266,327 B1 | * | 7/2001 | Hernandez-Valencia .... 370/252 |
| 6,278,714 B1 | * | 8/2001 | Gupta ......................... 370/422 |
| 6,298,387 B1 | | 10/2001 | Prasad et al. |
| 6,633,543 B1 | * | 10/2003 | Storr ....................... 370/236.1 |

\* cited by examiner

*Primary Examiner*—Ricky Ngo
*Assistant Examiner*—Phuongchau B Nguyen
(74) *Attorney, Agent, or Firm*—Schwabe, Williamson & Wyatt, P.C.

(57) ABSTRACT

A buffering structure including at least a first FIFO storage structure to stage at least a selected one of undiverted egress packets and undiverted ingress packets is provided. The buffering structure further includes at least first associated packet drop logic to selectively effectuate head or tail flushes of the first FIFO storage structure. In various embodiments, one or more additional FIFO storage structures are also provided to stage one or more diverted and/or insertion of egress/ingress packets. Those use for staging diverted egress/ingress packets are likewise provided with associated packet drop logic to perform tail flushes of these additional FIFO structures. In one application, the buffering structure is employed by a multi-protocol network processor, which in turn is employed by an optical networking module.

22 Claims, 8 Drawing Sheets

DATA LINK/PHYSICAL LAYER PACKET BUFFERING AND FLUSHING

BACKGROUND OF THE INVENTION

1. Field of the Invention

The present invention relates to the field of networking. More specifically, the present invention relates to packet buffering and flushing for high-speed network trafficking equipment, such as 10-gigabit optical-electrical routers or switches.

2. Background Information

With advances in integrated circuit, microprocessor, networking and communication technologies, increasing number of devices, in particular, digital computing devices, are being networked together. Devices are often first coupled to a local area network, such as an Ethernet based office/home network. In turn, the local area networks are interconnected together through wide area networks, such as SONET networks, ATM networks, Frame Relay, and the like. Of particular importance is the TCP/IP based global inter-network, the Internet.

As a result of this trend of increased connectivity, increasing number of applications that are network dependent are being deployed. Examples of these network dependent applications include but are not limited to, the World Wide Web, e-mail, Internet based telephony, and various types of e-commerce and enterprise applications. The success of many content/service providers as well as commerce sites depend on high-speed delivery of a large volume of data across wide areas. In turn, the trend leads to increased demand for high-speed data trafficking.

Historically, data communication protocols specified the requirements of local/regional area networks, whereas telecommunication protocols specified the requirements of the regional/wide area networks. The rapid growth of high volume, high-speed data routing over the Internet has fueled a convergence of data communication (datacom) and telecommunication (telecom) protocols and requirements. It is increasingly important that data traffic be carried efficiently at high speed across local, regional and wide area networks.

Figure 1:
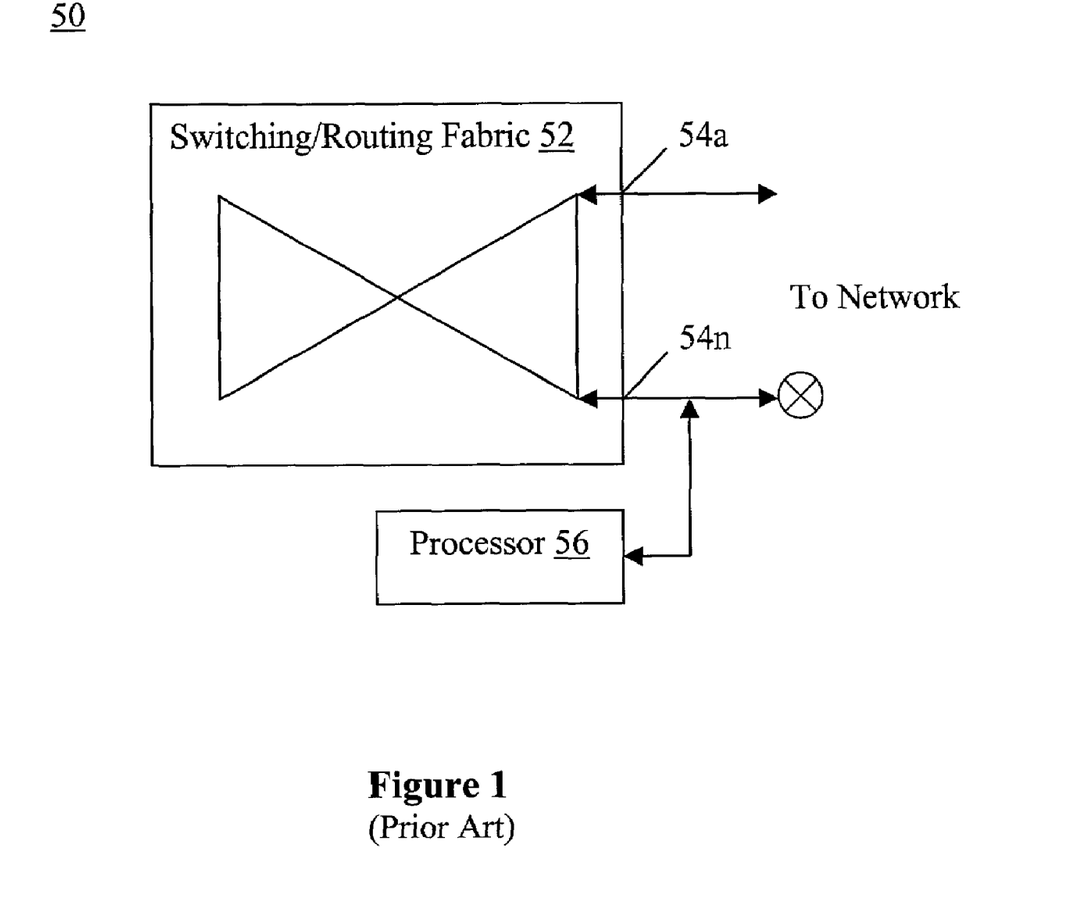
FIG. 1 illustrates a typical prior art approach to providing packet diversion and insertion.

When routing or switching network traffic, a need often arises to divert some of the packets being routed/switched onto a routing path (to perform additional processing or dropping the packets), or insert additional packets into the packet streams being received off a routing path. FIG. 1 illustrates a typical prior art approach to providing such functionality of packet diversion and/or packet insertion to an "intermediate" networking equipment. Illustrated is an example networking switch/router 50 having switching/routing fabric 52, including a number of ingress/egress points 54*a*-54*n*, through which packets may be received and/or routed onto the corresponding coupled mediums (routing paths). To provide the desired packet diversion and/or insertion functionality, one or more of ingress/egress points 54*a*-54*n*, such as point 54*n*, are reserved for the coupling of one or more companion processors 56 (also referred to as host processors), as opposed to the mediums connecting the switch/router to a network. The basic implementations of these switches/routers would route all packets through host processors 56, to enable host processors 56 to selectively divert some of the packets from the various routing paths (for additional processing or dropping the packets) or to selectively inject additional packets into the packet streams of the various routing paths. In other more advanced implementations, additional switching/routing resources (such as programmable switching/routing tables) (not shown) may be employed to facilitate routing of some of the packets of the routing paths to host processors 56 for "processing" ("diversion"), and routing of the packets injected by host processors 56 onto the routing paths of their selection ("insertion").

These prior art approaches all suffer from the common disadvantage in that at least one of the ingress/egress point of switching/routing fabric 52 is used for the coupling of a host processor 56. As networking speed increases, with more and more packets being routed/switched over a unit of time, host processor 56 becomes a bottleneck under these prior art approaches. Typically, more than one host processor 56 have to be employed, resulting in more than one ingress/egress points 54*a*-54*n* being consumed, which in turn leads to a reduction in the bandwidth of networking equipment 50 (for a given amount of switching/routing resources (fabric 52)). Increasingly, these architectures are becoming un-scalable for the type of efficient, high speed (10 Gb and beyond) networking that spans local, regional, and wide area networks, especially when multiple datacom and telecom protocols are involved.

Thus, an improved approach to packet diversion and insertion, including buffering and flushing of buffered packets, is desired.

BRIEF DESCRIPTION OF DRAWINGS

The present invention will be described by way of exemplary embodiments, but not limitations, illustrated in the accompanying drawings in which like references denote similar elements, and in which.

GLOSSARY

| | |
|---|---|
| 10Gbase-LR | 64/66 coded 1310 nm LAN standard for 10 Gigabit Ethernet |
| 10Gbase-LW | 64/66 coded SONET encapsulated 1310 nm WAN standard for 10 Gigabit Ethernet |
| ASIC | Application Specific Integrated Circuit |
| CRC | Cyclic Redundancy Check |
| Egress | Outgoing data path from the system to the network |
| EOP | End of Packet |
| FOS | Ethernet on SONET |
| FCS | Frame Check Sequence |
| FIFO | First In First Out |
| HDLC | High-Level Data Link Control. A communication protocol used in Packet over SONET switching network. |
| Ingress | Incoming data path from the network to the system |
| IP | Internet Protocol |
| LAN | Local Area Network |
| LVDS | Low voltage differential signal |
| MAC | Media Access Control layer, defined for Ethernet systems |
| OIF | Optical Internetworking Forum |
| POS | Packet over SONET |
| PPP | Point to Point Protocol |
| SDH | Synchronous Digital Hierarchy |
| SONET | Synchronous Optical network, a PHY telecommunication protocol |
| SOP | Start of Packet |
| SPI-4 | System Packet Interface Level 4(also POS-PHY 4) |
| SSTL | Stub Series Terminated Logic |
| XGMII | 10Gb Media Independent Interface |
| WAN | Wide Area Network |

DETAILED DESCRIPTION OF THE INVENTION

The present invention includes a buffering structure having storage structures and associated packet diversion and insertion logic to facilitate post-switching, pre-medium placement diversion and/or insertion of egress packets, and/or post-medium extraction, pre-switching diversion and/or insertion of ingress packets, in particular, during data link/physical layer processing of the ingress and/or egress packets. In another aspect, the buffering structure further includes selective tail and head flushing of the buffered packets. Both aspects address supports for multiple datacom and telecom protocols.

In the following description, various aspects of the present invention will be described. However, the present invention may be practiced with only some aspects of the present invention. For purposes of explanation, specific numbers, materials and configurations are set forth in order to provide a thorough understanding of the present invention. However, the present invention may be practiced without the specific details. In other instances, well-known features are omitted or simplified in order not to obscure the present invention. Further, the description repeatedly uses the phrase "in one embodiment", which ordinarily does not refer to the same embodiment, although it may. The terms "comprising", "having", "including" and the like, as used in the present application, including in the claims, are synonymous.

Overview

Figure 2:
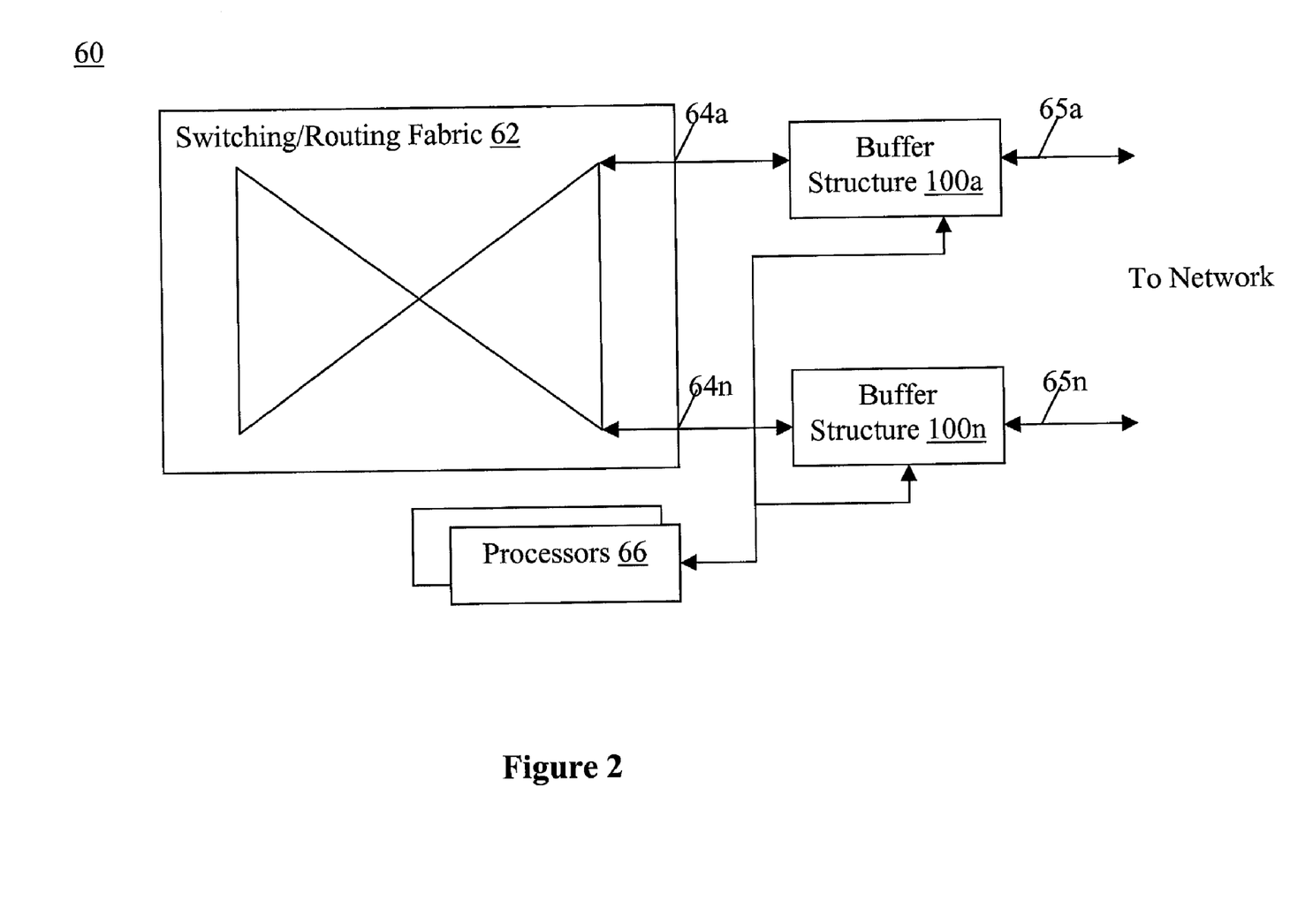
FIG. 2 illustrates an overview of the data link/physical layer packet diversion and insertion of present invention, in accordance with one embodiment.

Referring now to FIG. 2, wherein a block diagram illustrating an overview of the present invention, in accordance with one embodiment, is shown. As illustrated, networking switch/router 60 having switching/routing fabric 62, including ingress/egress points 64a-64n, through which packets may be received and/or routed onto the corresponding coupled mediums (routing paths), in accordance with the present invention, is provided with a number of buffering structures 100a-100n to facilitate packet diversion and insertion, including selective tail or head flushing of buffered packets, for multiple datacom and telecom protocols. Buffering structures 100a-100n in accordance with the present invention are disposed between ingress/egress points 64a-64n and the corresponding mediums coupling switch/router 60 to one or more networks. As will be described in more detail below, each of buffering structures 100a-100n includes a number of storage structures, associated packet diversion and insertion logic, including packet flushing logic, as well as a processor interface to allow processors 66 to direct the diversion of packets, access the diverted packets, as well as inject packets for egress and/or ingress packets. Each of buffering structures 100a-100n also allows selective head or tail flushing of buffered packets. As a result of these features, and its advantageous disposition, buffering structures 100a-100 are able to facilitate post-switching, pre-medium placement, diversion and/or insertion of egress packets, as well as post-medium extraction, pre-switching, diversion and/or insertion of ingress packets for multiple datacom and telecom protocols.

As is readily apparent from the illustration, unlike the prior art, the present invention is able to facilitate the packet diversion and insertion functionalities without taking up ingress/egress points 64a-64n of switching/routing fabric 62, and therefore, bandwidth of switch/router 60. Moreover, the diversion and insertion of egress packets may be performed "very late", just prior to placement of the packets onto the coupling mediums, e.g. during data link/physical layer processing of the egress packets, and likewise, the diversion and insertion of ingress packets may be performed "very early", as soon as extraction of the packets from the coupling mediums, e.g. during data link/physical layer processing of the ingress packets. Accordingly, in a presently preferred embodiment, as illustrated by an exemplary application of the present invention to be described later (referencing FIG. 9-10), buffering structures 100a-100n are advantageously provided as an integral part of the ASICs that provide data link/physical layer processing for multiple datacom and telecom protocols, in particular, in an integrated optical networking module.

Buffering Structure

Figure 3:
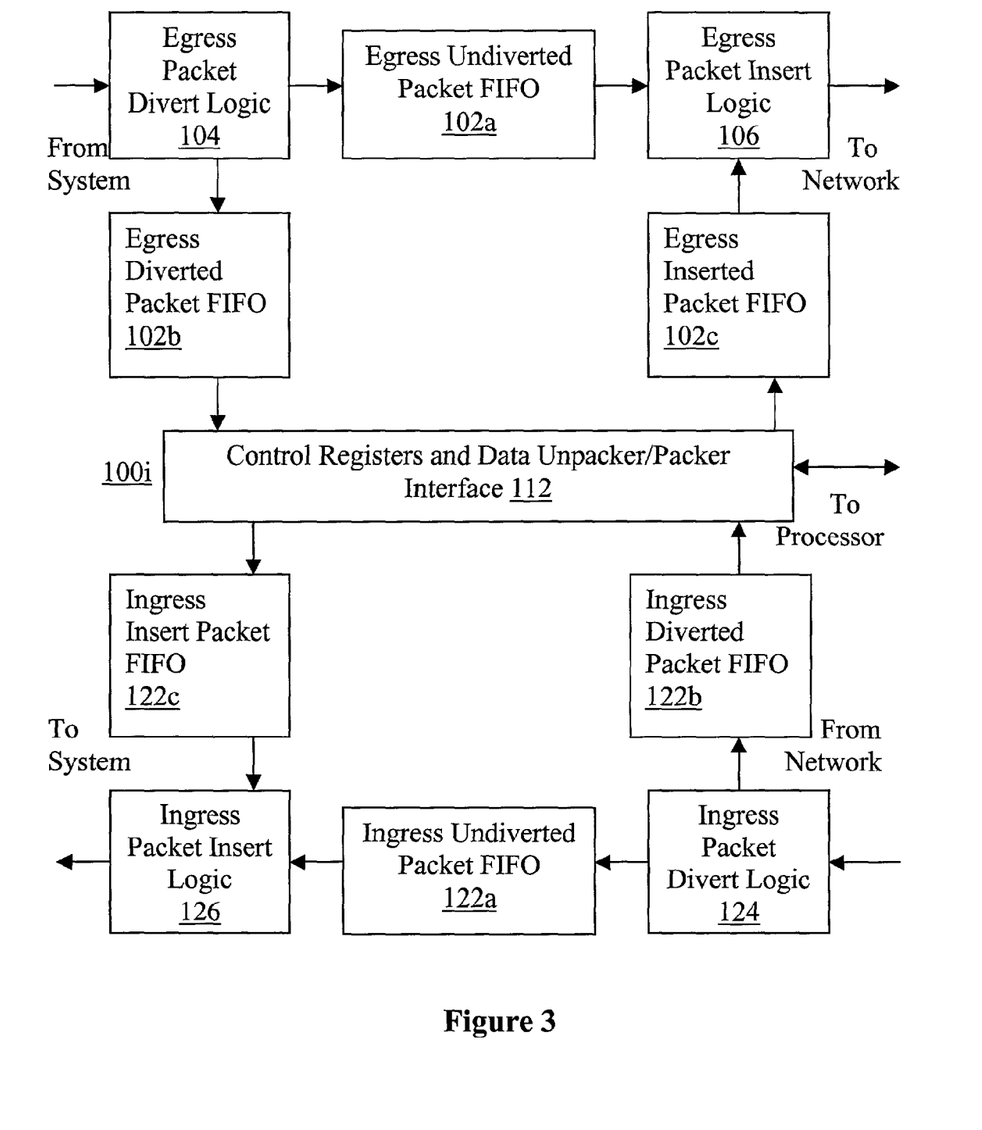
FIG. 3 illustrates the buffering structure of FIG. 2 in further detail, in accordance with one embodiment.

FIG. 3 illustrates one of buffering structures 100a-100n of FIG. 2 in further details in accordance with one embodiment. As illustrated, for the embodiment, buffering structure 100i includes a number of egress packet storage structures 102a-102c, egress packet divert logic 104 and egress packet insert logic 106. Egress packet storage structures 102a-102c includes egress undiverted packet storage structure 102a, egress diverted packet storage structure 102b, and egress insert packet storage structure 102c, employed to stage the egress undiverted packets, egress diverted packets, and egress insert packets respectively. Egress packet divert logic 104 is employed to selectively divert some of the egress packets to the diversion path, i.e. egress diverted packet storage structure 102b, whereas egress insert logic 106 is employed to selectively merge the staged egress insert packets onto the transmit path, i.e. merging the egress undiverted and insert packets staged at storage structures 102a and 102c.

For the embodiment, buffering structure 100i further includes a number of ingress packet storage structures 122a-122c, ingress packet divert logic 124, ingress packet insert logic 126, and in particular, processor interface 112. Ingress packet storage structures 122a-122c includes ingress undiverted packet storage structure 122a, ingress diverted packet storage structure 122b, and ingress insert packet storage structure 122c, employed to stage the ingress undiverted packets, ingress diverted packets, and ingress insert packets respectively. Ingress packet divert logic 124 is employed to selectively divert some of the ingress packets to the diversion path, i.e. ingress divert storage structure 122b, whereas ingress packet insert logic 126 is employed to selectively merge the staged ingress insert packets onto the receive path, i.e. merging the ingress undiverted and insert packets staged at storage structures 122a and 122c.

In one embodiment, storage structures 102a-102c and 122a-122c are First-In First-Outs (FIFO) storage structures; and processor interface 112 is a register-based interface, accessible via a data bus or processor interface (not shown), and includes associated read and write pointers. More specifically, in one embodiment, the egress undiverted packet FIFO 102a has a size of 1536 word by 73 bits (64-bits for the packet data, plus 4-bit SOP, 4-bit EOP and 1 bad packet bit indicator), and each of the egress diverted packet FIFO 102b and egress insert packet FIFO 102c has a size of 64 words by 73 bits. Similarly, the ingress undiverted packet FIFO 122a has a size of 1536 word by 73 bits, and each of the ingress diverted packet FIFO 122b and ingress insert packet FIFO 122c has a size of 64 words by 73 bits.

Before proceeding to describe the logic components, i.e. components 104-106 and 124-126, in further detail, it should be noted that while for completeness, the embodiment is comprehensively illustrated to include facilities associated with packet diversion and packet insertion for egress as well as ingress packets. In practice, the present invention may be practiced with only some of these features to practice only some of the aspects of the present invention, e.g. diversion of egress packets only, insertion of egress packets only, diversion of ingress packets only, or insertion of ingress packets only, or combination thereof.

Egress Diversion

Figure 4:
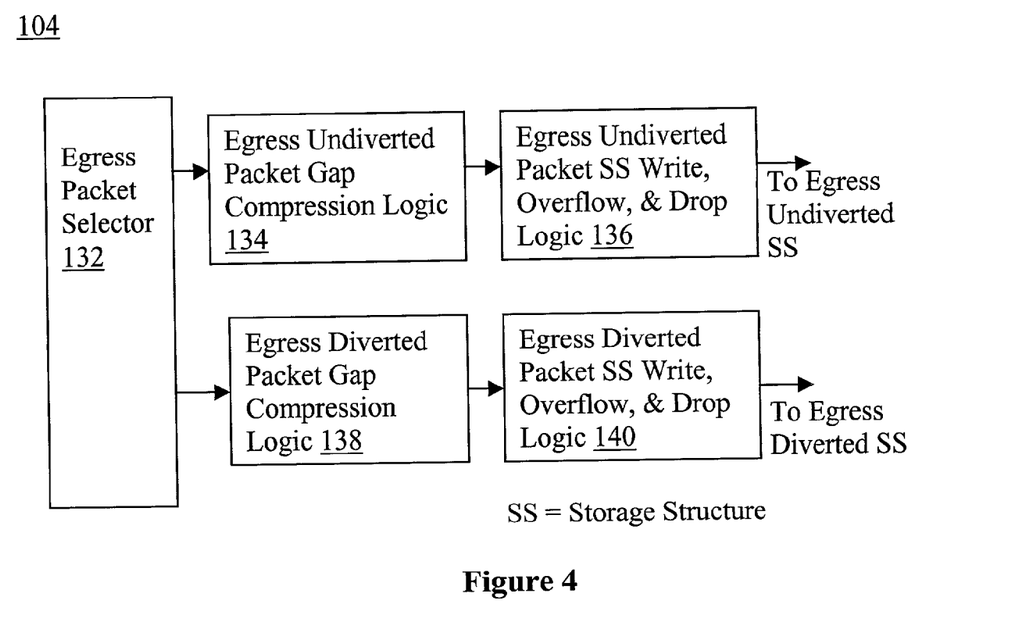
FIG. 4 illustrates the egress divert block of FIG. 3 in further detail, including write packet drop logics equipped with tail flushing capability for multiple datacom and telecom protocols, in accordance with one embodiment.

Turning now to FIG. 4, wherein egress packet divert logic 104 of FIG. 3 is illustrated in further details in accordance with one embodiment. As shown, for the embodiment, egress packet divert logic 104 includes egress packet selector 132, egress undiverted packet gap compression logic 134, egress undiverted packet SS write and overflow packet drop logic 136, egress diverted packet gap compression logic 138, and egress diverted packet SS write, overflow and drop logic 136.

Egress packet selector 132 is designed to receive the egress packet data, including the associated SOP, EOP, and bad packet bits, as well as a number of control signals. The control signals include in particular, a first control signal denoting an egress packet is to be diverted, and a second control signal denoting an egress packet is to be dropped. Responsive to the assertion of the divert control signal, egress packet selector 132 routes the egress packet data being received to the diversion path (diverted packet storage structure 102b); otherwise, the received egress packet data are allowed to pass thru onto the transmit path (undiverted packet storage structure 102a).

Each of the egress packet gap compression logic 134 and 138 removes packet data gaps for the corresponding data paths, i.e. transmit and diversion paths. Further, each of egress packet gap compression logic 134 and 138 generates a data ready signal for the corresponding following storage structure's write, overflow and drop logic 136 and 140, when a complete n-bit word of the egress packet is available (n being 64 in the earlier described FIFO embodiments).

Each of the write, overflow and drop logic 136 and 140, in response, generates a write enable signal for the corresponding storage structure 102a and 102b, and writes the n-bit word, along with the SOP, EOP and bad packet indicator bit into one n-bit storage word of the storage structure 102a/102b. Diverted packet write, overflow and drop logic 140 also generates a signal to convey packet availability to the host processor, when a complete packet is ready for the host processor to retrieve.

For the embodiment, each of write, overflow and drop logic 136 and 140 is also responsible for flushing the corresponding storage structure, i.e. storage structure 102a and 102b, total or tail only, when a corresponding flushing bit (specified e.g. in a configuration register (not shown)) is set.

For the earlier described FIFO embodiments, total flushing of FIFO 102a/102b may be accomplished by synchronously resetting both the associated write and read pointers (not shown) of the FIFO to zero.

Further, for the embodiment, each of write, overflow and drop logic 136 and 140 is responsible for packet dropping from the "tail" of the corresponding storage structure 102a and 102b ("tail flushing"). For the embodiment, each of write, overflow and drop logic 136 and 140 initiates the tail packet dropping/flushing process if one of a number of conditions occur. Examples of these conditions include but are not limited to
  a) Storage structure overflow caused by an attempted write into a full storage structure; and
  b) In response to the earlier mentioned packet drop control signal.

For the earlier described FIFO embodiments, for the former cause (condition (a)), logic 136/140 reloads the associated write pointer to the SOP location of the packet being dropped +2, and writing an EOP condition into the SOP+2 location, with the bad packet bit set. Further, the residual truncated packet is invalidated by the corresponding read, underflow and drop logic 142/144 of egress insert logic 106. This manner of tail flushing is performed except while operating for packets transmitted in accordance with the HDLC and SONET protocols.

In one embodiment, in support of packets transmitted in accordance with the HDLC and SONET protocols, logic 136/140 also accounts for the possibility that the SOP has already been read out of storage structure 102a/102b, during an overflow situation. More specifically, for the earlier described FIFO embodiments, logic 136/140 reloads the write pointer with the read pointer address plus 8. Logic 136/140 then writes the EOP at this location, with the bad packet bit set, which results in a partial flush of the bad packet. The bad packet flag in turn will also alert a downstream MAC or HDLC processor that the preceding packet was aborted. In one embodiment, the MAC or HDLC processor responds by corrupting the CRC of the truncated packet to guarantee that the packet be dropped by a downstream entity.

For the earlier described FIFO embodiments, for the latter cause (condition (b)), logic 136/140 also takes into account whether SOP of the aborted packet is still in the corresponding FIFO 102a/102b. If the SOP of the aborted packet is still in the FIFO, and if the SOP address is 6 greater than the read pointer address, upon detecting the packet drop signal, logic 136/140 reloads the FIFO write pointer with the abort packet's SOP address plus 2, and then writes the EOP to this location, with the bad packet bit set. Again, the residual partial packet is invalidated by the corresponding read, underflow and drop logic 142/144 of egress insert logic 106. If the SOP of the aborted packet is still in the FIFO, and if the SOP address is less than 6 larger than the read pointer address, the EOP and bad packet bit is written to the read point address plus 8 to insure the read pointer will not advance past the write pointer and miss the EOP and bad packet bit, and cause the pointers to get out of sequence. The corresponding FIFO read, underflow and drop logic 142/144 of egress insert logic 106 is employed to invalidate the byte containing the EOP. If on the other hand, the SOP of the aborted packet has already been read out of the FIFO, logic 106 will reload the FIFO write pointer with the read pointer address plus 8. Logic 106 then writes the EOP at this location, with the bad packet bit set, resulting in a partial flush of the bad packet. Again, the bad packet flag will be detected by the corresponding read, underflow and drop logic 142/144 of egress insert logic 106.

In one embodiment, in support of packets transmitted in accordance with the EOS protocol, write, overflow and drop logic 136/140 is also designed to generate the byte count of an EOS data packet (during an EOS mode of operation), to facilitate subsequent insertion of the packet byte length into a 2-byte field after the preamble, during frame generation for EOS. In one embodiment, an additional 16-bit wide, 40-word deep FIFO (not shown) is employed to store the generated EOS packet sizes.

Egress Insertion

Figure 5:
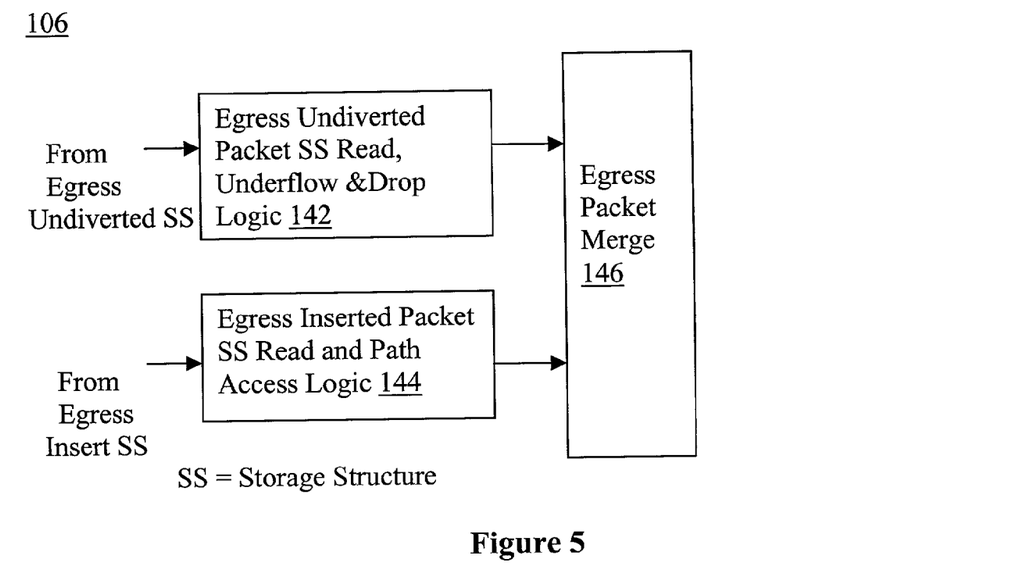
FIG. 5 illustrates the egress insert block of FIG. 3 in further detail, including read packet drop logics equipped with head flushing capability for multiple datacom and telecom protocols, in accordance with one embodiment.

FIG. 5 illustrates egress packet insert logic 106 of FIG. 3 in further details in accordance with one embodiment. As illustrated, for the embodiment, egress packet insertion logic 106 includes egress undiverted packet SS read, underflow and drop logic 142, egress inserted packet SS read and path access logic 144, and egress packet merge logic 146.

Egress packet merge logic 146 is employed to generate a read enable signal for either read, underflow and drop logic 142 and 144 to select egress packets stored in one of the two storage structures 102*a* and 102*c*.

Read, underflow and drop logic 142 is responsible for generating the read enable signal in response for the selection of storage structure 102*a*, to enable data flow from storage structure 102*a*.

Read, underflow and drop logic 142 is also responsible for flushing the corresponding storage structure 102*a*, total or head only. For the earlier described FIFO embodiments, total flushing may be accomplished, as described earlier, by synchronously resetting both the write and read pointers to zero. No additional data words, of the current packet, will be written to the FIFO until a new SOP is received. Read, underflow and drop logic 142 will refrain from initiating any reading of the corresponding FIFO, until the FIFO word count of the corresponding FIFO exceeds a predetermined threshold.

Read, underflow and drop logic 142 is also responsible for packet dropping from the "head" of the corresponding storage structure. In one embodiment, read, underflow and drop logic 142 performs the "head" packet drop/flush in response to a number of predetermined conditions. Examples of these conditions include but are not limited to a) Egress datapath underflow caused by an attempted read of an empty storage structure; and b) In response to a packet drop control signal.

For the earlier described FIFO embodiments, for the earlier condition (i.e. condition (a)), read, underflow and drop logic 142 performs the "head" drop/flush by muxing an EOP into the data path. The action conveys to any subsequent (data link/physical layer) processing unit, e.g. a MAC or HDLC processor, that the current packet is bad. In one embodiment, the MAC or HDLC processor responds by corrupting the CRC of the current packet.

As described earlier, total flushing of the corresponding FIFO may be performed by synchronously resetting both the write and read pointers to zero. No additional data words, of the current packet, will be written into the corresponding FIFO, until a new SOP is received. Correspondingly, no reading of the FIFO on the output side will be initiated either, until the FIFO word count has reached a predetermined threshold.

For the earlier described FIFO embodiments, for the latter condition (i.e. condition (b)), read, underflow and drop logic 142 determines if the SOP of the aborted packet is still in the process of being read out in the output side, when the EOP and bad packet bit are detected. If so, the remaining words of the truncated packet are invalidated. Thus, upon completing the dropping of the rest of the aborted packet on the write side, dropping of the current packet is effectuated.

If the SOP has already been read out, the EOP byte of the current word is invalidated. The action will notify subsequent processing units, such as MAC or HDLC processors, that the current packet is bad. Again, in one embodiment, the MAC or HDLC processor responds by corrupting the CRC of the current packet.

In like manner, read and path access logic 144 is responsible for generating the read enable signal in response for the selection of storage structure 102*c*, to enable data flow from storage structure 102*c*. Read and path access logic 144 is also responsible for notifying the host processor that it may provide additional insert data when storage structure 102*c* becomes empty.

Processor Interface—Egress Packet Side

Figure 6:
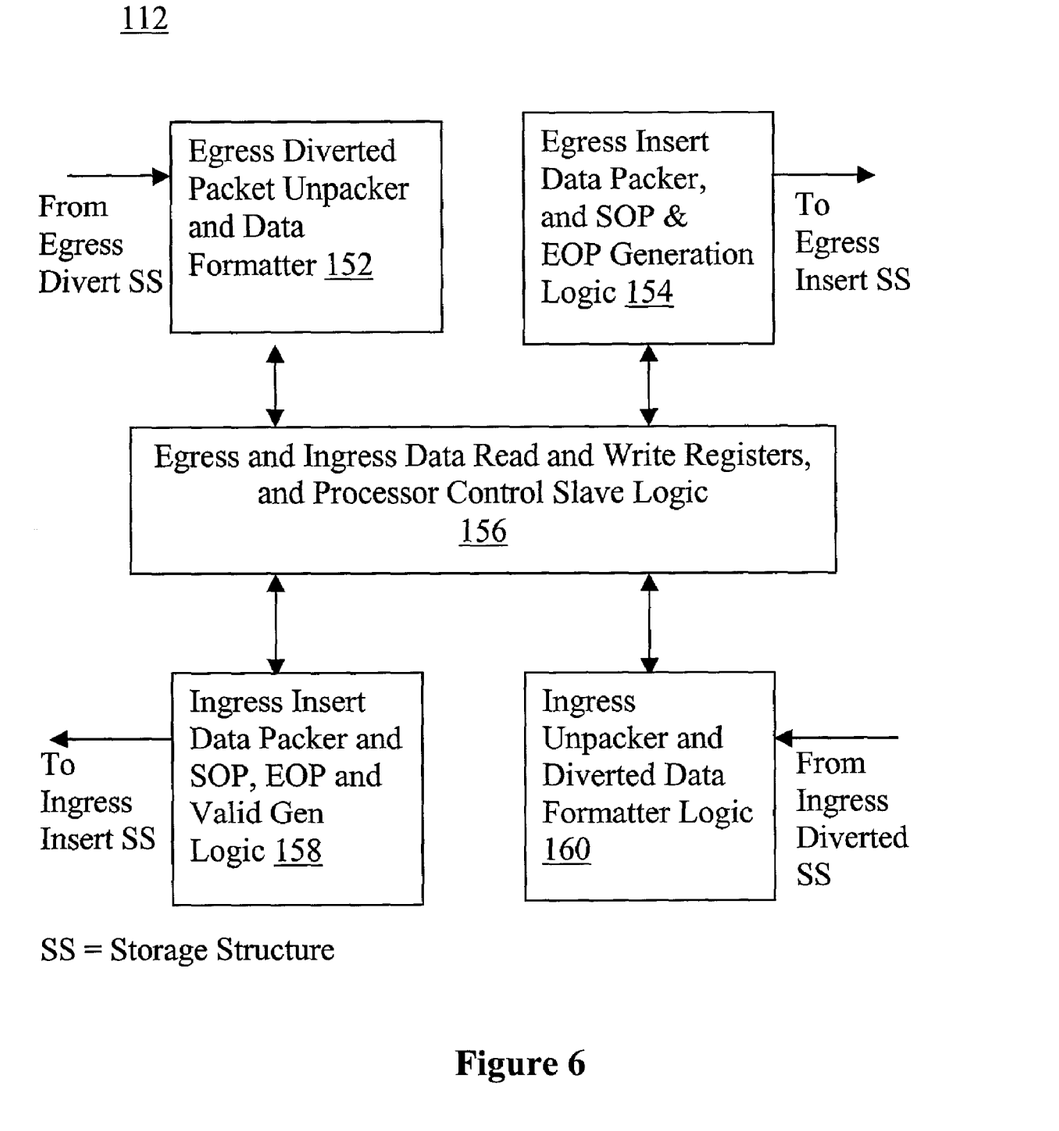
FIG. 6 illustrates the register interface of FIG. 3 in further detail, in accordance with one embodiment.

FIG. 6 illustrates processor interface 112 of FIG. 3 in further details in accordance with one embodiment. As illustrated, for the embodiment, for the egress packet side, processor interface 112 includes a number of egress data read and write (R/W) registers, and their associated processor control slave logic 156, egress diverted packet unpacker and data formatter 152, and egress insert data packer and SOP/EOP generation logic 154.

Egress data R/W registers, and their associated processor control slave logic 156 are employed to facilitate a host processor in retrieving the egress diverted packet data, and providing the egress insert packet data. In response to a notice of the egress diverted packet data being ready for the host processor to retrieve, the host processor generates the appropriate control signals for egress diverted packet unpacker and data formatter 152 through the associated processor control slave logic 156. Egress diverted packet unpacker and data formatter 152 in response, generates the appropriate read enable signals for the egress diverted packet storage structure 102*b*. Further, unpacker and data formatter 152 reads the gap-compressed packet data and the associated SOP, EOP and bad packet indicator from storage structure 102*b*, and "unpack" them for placement onto the appropriate bit positions of the data bus. The process continues until the EOP is encountered (i.e. the applicable EOP bit set).

In like manner, a host processor generates the appropriate control signals for egress insert data packer and SOP/EOP generation 154 through the associated processor control slave logic 156. Egress insert data packer and SOP/EOP generation 154 in response, generates the appropriate write enable signals for the egress insert storage structure 102*c*. Further, data packer and SOP/EOP generation 154 writes the insert data and the associated SOP, EOP and bad packet indicator bits into storage structure 102*c* in "packed" form, and the unpacked portions are successively taken off the appropriate bit positions of the data bus.

Ingress Diversion

Figure 7:
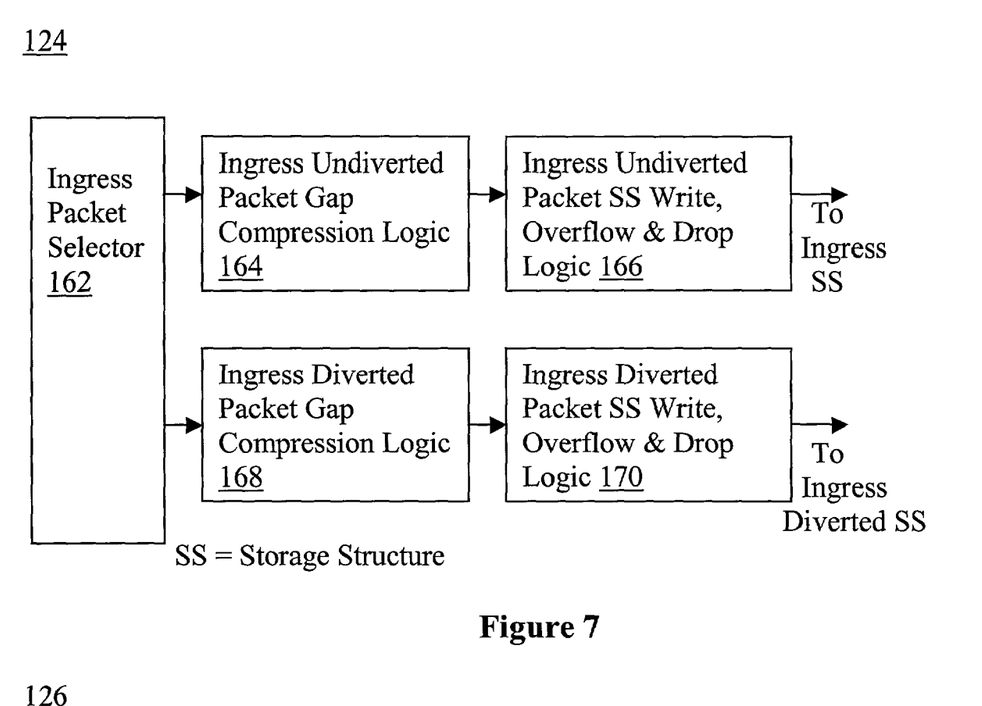
FIG. 7 illustrates the ingress divert block of FIG. 3 in further detail, including write packet drop logics equipped with tail flushing capability for multiple datacom and telecom protocols, in accordance with one embodiment.

FIG. 7 illustrates ingress packet divert logic 124 of FIG. 3 in further details in accordance with one embodiment. As illustrated, for the embodiment, ingress packet divert logic 124 includes ingress packet selector 162, ingress undiverted packet gap compression logic 164, ingress undiverted packet SS write, overflow and drop logic 166, ingress diverted packet gap compression logic 168, ingress diverted packet SS write, overflow and drop logic 170.

Ingress packet selector 162 is designed to receive the packet data, including the associated SOP, EOP, and bad packet bits, as well as a number of control signals. The control signals include in particular, a first control signal denoting an ingress packet is to be diverted, and a second control signal denoting an ingress packet is to be dropped. Responsive to the assertion of the control signal denoting an ingress packet is to be diverted, ingress packet selector 132 routes the ingress packet data being received to the diversion path (diverted packet storage structure 122b); otherwise, the received ingress packet data are allowed to pass thru onto the receive path (undiverted packet storage structure 122a).

Each of the ingress packet gap compression logic 164 and 168 removes packet data gaps for the corresponding data paths, i.e. receive and diversion paths. Further, each of ingress packet gap compression logic 164 and 168 generates a data ready signal for the corresponding following storage structure's write, overflow and drop logic 166 and 170, when a complete n-bit word is available (n being 64 in the earlier described FIFO embodiments).

Each of the write, overflow and drop logic 166 and 170, in response, generates a write enable signal for the corresponding storage structure 122a and 122b, and writes the n-bit word, along with the SOP, EOP and bad packet indicator bit into one n-bit storage word. Diverted packet write, overflow and drop logic 170 also generates a signal to convey packet availability to a host processor, when a complete ingress packet is ready for the host processor to retrieve.

For the embodiment, each of write, overflow and drop logic 166 and 170 is also responsible for flushing the corresponding storage structure, i.e. storage structure 122a and 122b (total or tail only), when a corresponding flushing bit (specified e.g. in a configuration register (not shown)) is set.

For the earlier described FIFO embodiments, total flushing FIFO 122a/122b may be accomplished by synchronously resetting both the associated write and read pointers of the FIFO to zero.

Further, for the embodiment, each of write, overflow and drop logic 166 and 170 is responsible for packet dropping from the "tail" of the corresponding storage structure 122a and 122b. For the embodiment, each of write, overflow and drop logic 166 and 170 initiates the packet dropping process if one of a number of conditions occurs. Examples of these conditions include but are not limited to a) Storage structure overflow caused by an attempted write into a full storage structure; and b) In response to the earlier mentioned packet drop control signal.

For the earlier described FIFO embodiments, for the former cause (condition (a)), logic 166/170 reloads the associated write pointer to the SOP location of the packet being dropped +2, and writing an EOP condition into the SOP+2 location, with the bad packet bit set. Further, the residual truncated packet is invalidated by the corresponding read, underflow and drop/path access logic 172/174 of ingress insert logic 126. This manner of tailing flushing is performed except when operating for packets transmitted in accordance with the HDLC and SONET protocols.

In one embodiment, in support of packets transmitted in accordance with the HDLC and SONET protocols, logic 166/170 also accounts for the possibility that the SOP has already been read out of storage structure 122a/122b by the downstream SPI-4 logic 204 (FIG. 9), during an overflow situation. More specifically, for the earlier described FIFO embodiments, logic 166/170 reloads the write pointer with the read pointer address plus 8. Logic 166/170 then writes the EOP at this location, with the bad packet bit set, which results in a partial flush of the bad packet. If the bad packet SOP has already been transferred to the downstream SPI-4 logic 204, an abort indication is asserted to the SPI-4 logic 204, causing the SPI-4 logic 204 to abort the bad packet transfer.

Figure 9:
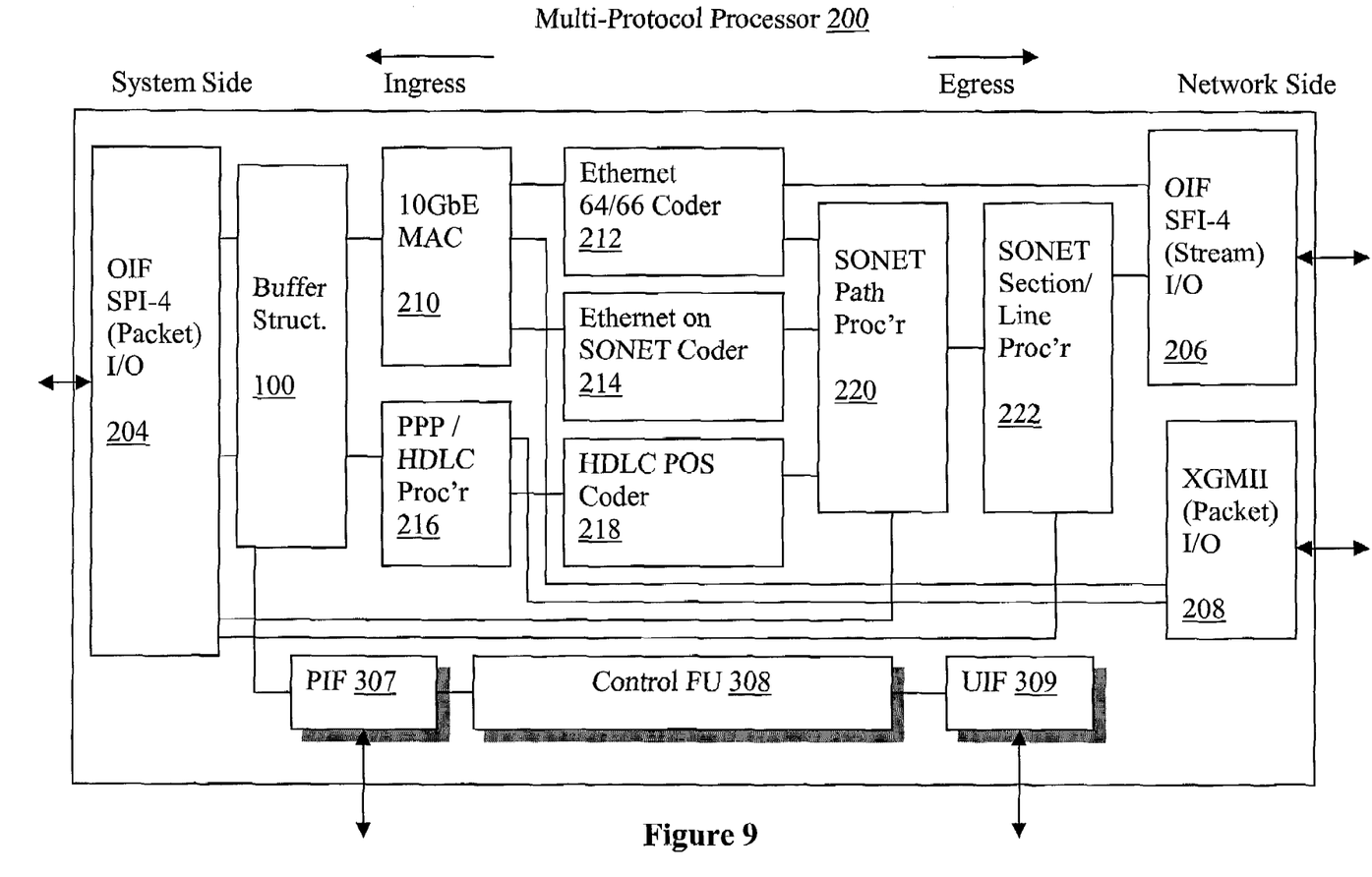
FIG. 9 illustrates a multi-protocol network processor incorporated with the present invention, in accordance with one example application.

For the earlier described FIFO embodiments, for the latter cause (condition (b)), logic 166/170 also takes into account whether SOP of the aborted packet is still in the corresponding FIFO 122a/122b. If the SOP of the aborted packet is still in the FIFO, and if the SOP address is 6 greater than the read pointer address, upon detecting the drop packet signal, logic 166/170 reloads the FIFO write pointer with the abort packet's SOP address plus 2, and then writes the EOP to this location, with the bad packet bit set. Again, the residual partial packet is invalidated by the corresponding read, underflow and drop/path access logic 172/174 of ingress insert logic 126. If the SOP of the aborted packet is still in the FIFO, and if the SOP address is less than 6 larger than the read pointer address, the EOP and bad packet bit is written to the read point address plus 8 to insure the read pointer will not advance pass the write pointer and miss the EOP and back packet bit, and cause the pointers to get out of sequence. The corresponding FIFO read, underflow and drop/path access logic 172/174 of ingress insert logic 126 is employed to invalidate the byte containing the EOP. If on the other hand, the SOP of the aborted packet has already been read out of the FIFO, logic 126 will reload the FIFO write pointer with the read pointer address plus 8. Logic 126 then writes the EOP at this location, with the bad packet bit set, resulting in a partial flush of the bad packet. Again, the bad packet flag will be detected by the corresponding read, underflow and drop/path access logic 172/174 of ingress insert logic 126. If the bad packet SOP has already been read by the SPI-4 logic 204, logic 126 signals an abort condition to the SPI-4 logic 204. This causes the SPI-4 logic 204 to abort the bad packet currently being transferred.

Ingress Insertion

Figure 8:
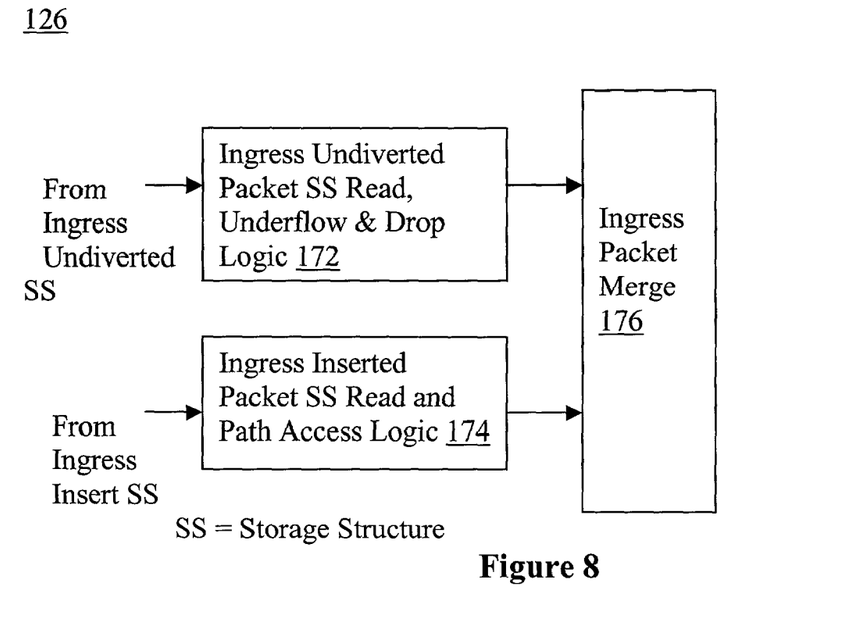
FIG. 8 illustrates the ingress insert block of FIG. 3 in further detail, including read packet drop logics equipped with head flushing capability for multiple datacom and telecom protocols, in accordance with one embodiment.

FIG. 8 illustrates ingress insertion logic 126 of FIG. 3 in further details in accordance with one embodiment. As illustrated, for the embodiment, ingress insertion, logic 126 includes ingress undiverted packet read, underflow and drop logic 172, ingress inserted packet read and path access logic 174, and ingress packet merge logic 176.

Ingress packet merge logic 176 is employed to generate a read enable signal for either read, underflow and drop logic 172 or read and access path logic 174 to select ingress packets stored in one of the two storage structures 122a and 122c.

Read, underflow and drop logic 172 is responsible for generating a read enable signal, in response, for the selection of storage structure 172a to enable data flow from the selected storage structure 172a.

Read, underflow and drop logic 172 is also responsible for flushing the corresponding storage structure 122a (total or head only). For the earlier described FIFO embodiments, total flushing may be accomplished, as described earlier, by synchronously resetting both the write and read pointers to zero. No additional data words, of the current packet, will be written into the ingress packet FIFO until a new SOP is received. Read, underflow and drop logic 172 will refrain from initiating any reading of the corresponding FIFO, until the FIFO word count of the corresponding FIFO exceeds a predetermined threshold.

Read, underflow and drop logic 172 is also responsible for packet dropping from the "head" of the corresponding storage structure 122a. In one embodiment, read, underflow and drop logic 172 performs the "head" packet drop in response to a number of predetermined conditions. Examples of these conditions, include but are not limited to
    a) Ingress datapath underflow caused by an attempted read of an empty storage structure;
    b) In response to a packet drop control signal.

For the earlier described FIFO embodiments, for the earlier condition (condition (a)), read, underflow and drop logic 172 performs the "head" drop by muxing an EOP into the data path. Additional, a control signal is generated for ingress packet merge 176 to forward the downstream processing units, e.g. a coupled system, that the current packet is to be dropped.

As described earlier, total flushing of the corresponding FIFO may be performed by synchronously resetting both the write and read pointers to zero. No additional data words, of the current packet, will be written into the corresponding FIFO, until a new SOP is received. Corresponding, no reading of the FIFO on the output side will be initiated either, until the FIFO word count has reached a predetermined threshold.

For the earlier described FIFO embodiments, for the latter condition (condition (b)), read, underflow and drop logic 142 determines if the SOP of the aborted packet is still in the process of being read out in the output side, when the EOP and bad packet bit are detected. If so, the remaining words of the truncated packet are invalidated. Thus, upon completing dropping the rest of the aborted packet on the write side, dropping of the current packet is effectuated.

If the SOP has already been read out, a control signal is generated for ingress packet merge 176 to forward the downstream processing units, e.g. a coupled system, to denote for the downstream processing units that the current packet is to be dropped.

In like manner, read and path access logic 174 is responsible for generating the read enable signal in response for the selection of storage structure 122c, to enable data flow from storage structure 102c. Read and path access logic 174 is also responsible for notifying the host processor that it may provide additional ingress insert data when storage structure 122c becomes empty.

Processor Interface—Ingress Side

Referring back to FIG. 6 again, wherein an embodiment of processor interface 112 of FIG. 3 is illustrated. As illustrated, for the embodiment, for the ingress packet side, processor interface 112 includes a number of ingress data read and write (R/W) registers, and their associated processor control slave logic 156, ingress diverted packet unpacker and data formatter 158, and ingress insert data packer and SOP/EOP generation logic 160.

Ingress data R/W registers, and their associated processor control slave logic 156 are employed to facilitate a host processor in retrieving the ingress diverted packet data and providing the ingress insert packet data. In response to a notice of the ingress diverted packet data being ready for a host processor to retrieve, the host processor generates the appropriate control signal for ingress diverted packet unpacker and data formatter 158 through the associated processor control slave logic 156. Ingress diverted packet unpacker and data formatter 158 in response, generates the appropriate read enable signals for the ingress diverted packet storage structure 122b. Further, unpacker and data formatter 172 reads the gap-compressed packet data and the associated SOP, EOP and bad packet indicator from storage structure 122b, and "unpack" them for placement onto the appropriate bit positions of the data bus. The process continues until the EOP is encountered (i.e. the applicable EOP bit set).

In like manner, a host processor generates the appropriate control signal for ingress insert data packer and SOP/EOP generation 160 through the associated processor control slave logic 156. Ingress insert data packer and SOP/EOP generation 160 in response, generates the appropriate write enable signals for the ingress insert storage structure 122c. Further, data packer and SOP/EOP generation 160 writes the insert data and the associated SOP, EOP and bad packet indicator bits into storage structure 122c in "packed" form, and the unpacked portions are successively taken off the appropriate bit positions of the data bus.

Protocol Processor

FIG. 9 illustrates an exemplary application of the present invention. Illustrated in FIG. 9 is multi-protocol processor 200 incorporated with the packet diversion and insertion teachings of the present invention, including packet flushing, for multiple datacom and telecom protocols. As illustrated, for the embodiment, multi-protocol processor 200 includes system interface 204, network interface 206, intermediate interface 208, media access control block 210, Ethernet 64/64 coder 212, Ethernet on SONET coder 214, point-to-point protocol (PPP) and high level data link control (HDLC) processor 216, HDLC Packet over SONET coder 218, SONET path processor 220, SONET section and line processor 222, and most importantly, buffering structure 100 of the present invention, coupled to each other as shown. Further, multi-protocol processor 200 includes control function unit and interfaces 307-309. Elements 204-222 are selectively employed in combination to service data transmission and receipt in accordance with a selected one of a number of frame based protocols, including frame based protocols encapsulated within a synchronous protocol, as well as streaming and packet variants of the synchronous protocol. In various embodiments, the protocols include at least one each a datacom and a telecom protocol, allowing multi-protocol processor 200 to support data trafficking spanning local, regional as well as wide area networks. In a presently preferred embodiment, multi-protocol processor 200 is implemented as a single ASIC.

More specifically, for the illustrated embodiment, the elements are employed in combination to service data transmission and receipt as follows:

| Protocols | Elements Employed |
|---|---|
| SONET Stream | System Interface, SONET Section/Line Processor, Network Interface |
| SONET Packet | System Interface, SONET path processor, SONET Section/Line Processor, Network Interface |
| Packet over SONET | System Interface, HDLC processor, HDLC POS coder, SONET path processor, SONET Section/Line Processor, Network Interface |

-continued

| | |
|---|---|
| Ethernet on SONET | System Interface, 10GbE MAC, Ethernet on SONET coder, SONET path processor, SONET Section/Line Processor, Network Interface |
| 10GbE WAN | System Interface, 10GbE MAC, Ethernet 64/66 coder, SONET path processor, SONET Section/Line Processor, Network Interface |
| 10GbE LAN | System Interface, 10GbE MAC, Ethernet 64/66 coder, Network Interface |
| MAC Frame | System Interface, 10GbE MAC, Intermediate Interface |
| HDLC Frame | System Interface, HDLC Processor, Intermediate Interface |

As those skilled in the art would appreciate, the concurrent support of these protocols in a dynamically selectable manner, in particular, the inclusion of 10 Gb Ethernet and Packet over SONET protocols, advantageously enables the processor to scale local, regional, and wide area networks.

For the illustrated embodiment, the "operating" protocol is specified to control function unit 308, which in turn controls the above enumerated elements accordingly. In a preferred variant of the illustrated embodiment, control function unit 308 includes a control register (not shown) having a 3-bit "protocol" field. The 3-bit "protocol" field is accessible via 3 corresponding pins (not shown) of processor interface 307.

System interface 204 is provided to facilitate input of egress data and output of ingress data. In one embodiment, system interface 204 is a 16-bit parallel LVDS packet interface, compliant with OIF's SPI-4 interface defined for OIF-SPI4-02.0, which is a "phase 2" interface for the communication of packetized data between a physical layer and link layer entity. In one implementation, the 16-bit differential transmit and receive data busses operate at speed up to 832 Mb/s per bus line. By virtue of the ability of multi-protocol processor 200 to support the afore enumerated protocols, the transmit and receive data (i.e. the egress and ingress data) may be MAC, IP, PPP, HDLC or SONET framed/streaming data (including their in-band control words, where applicable).

10 GbE MAC block 210 is provided to perform data link sub-layer media access control processing on egress and ingress MAC and IP data. For egress data, 10 GbE MAC block 210 accepts correctly formatted frames (minus the preamble or start frame delimiter), and in response, adding the appropriate preamble/start frame delimiter, padding the frames to the maximum frame size, calculating and inserting the appropriate frame check sequences.

Ethernet 64/66 coder 212 and Ethernet on SONET Coder 214 are provided to perform physical sub-layer 64/66 and Ethernet on SONET coding and decoding for the egress and ingress MAC and IP data respectively.

PPP/HDLC processor 216 is provided to perform data link sub-layer point-to-point protocol and high level data link control processing on PPP and HDLC data. PPP/HDLC processor 216 is employed to frame or de-frame IP and POS data, providing appropriate encapsulation or de-encapsulation, in accordance to PPP and HDLC. Similarly, HDLC POS coder 218 is provided to perform physical sub-layer Packet on SONET coding and decoding for the egress and ingress HDLC data respectively.

SONET path processor 220 is provided to perform path processing for "packetized" SONET data, whereas SONET section and line processor 222 is provided to perform section and line processing for "packetized" as well as "streaming" SONET data.

Network interface 206 is provided to facilitate output of egress data and input of ingress data. In one embodiment, correspondingly, Network interface 206 is a 16-bit LVDS interface compliant with OIF's SFI-4 interface. In one embodiment, it operates at 622 MHz (645 for Ethernet 64/66 encoded data). Similar to system interface 204, by virtue of the ability of processor 100 to support the various protocols, the egress and ingress data may be physically coded MAC, IP, PPP, HDLC or SONET framed/streaming data (including their in-band control words, where applicable). The coded data may be a SONET data stream encapsulating the higher-layer protocols or a 64/66 coded Ethernet stream.

Intermediate interface 208 on the other hand is provided to facilitate output of MAC or HDLC egress data and input of MAC or HDLC ingress data. In one embodiment, parallel interface 208 is a 32-bit SSTL-2 interface. In one embodiment, parallel interface 208 operates at 312.5 MHz.

Multi-protocol processor 200 is the subject matter of co-pending application entitled "A Multi-Protocol Processor With Data Traffic Support Spanning Local, Regional and Wide Area Networks", having at least partial common inventorship and filed May 18, 2001. The co-pending application is hereby fully incorporated by reference.

Optical Networking Module

Figure 10:
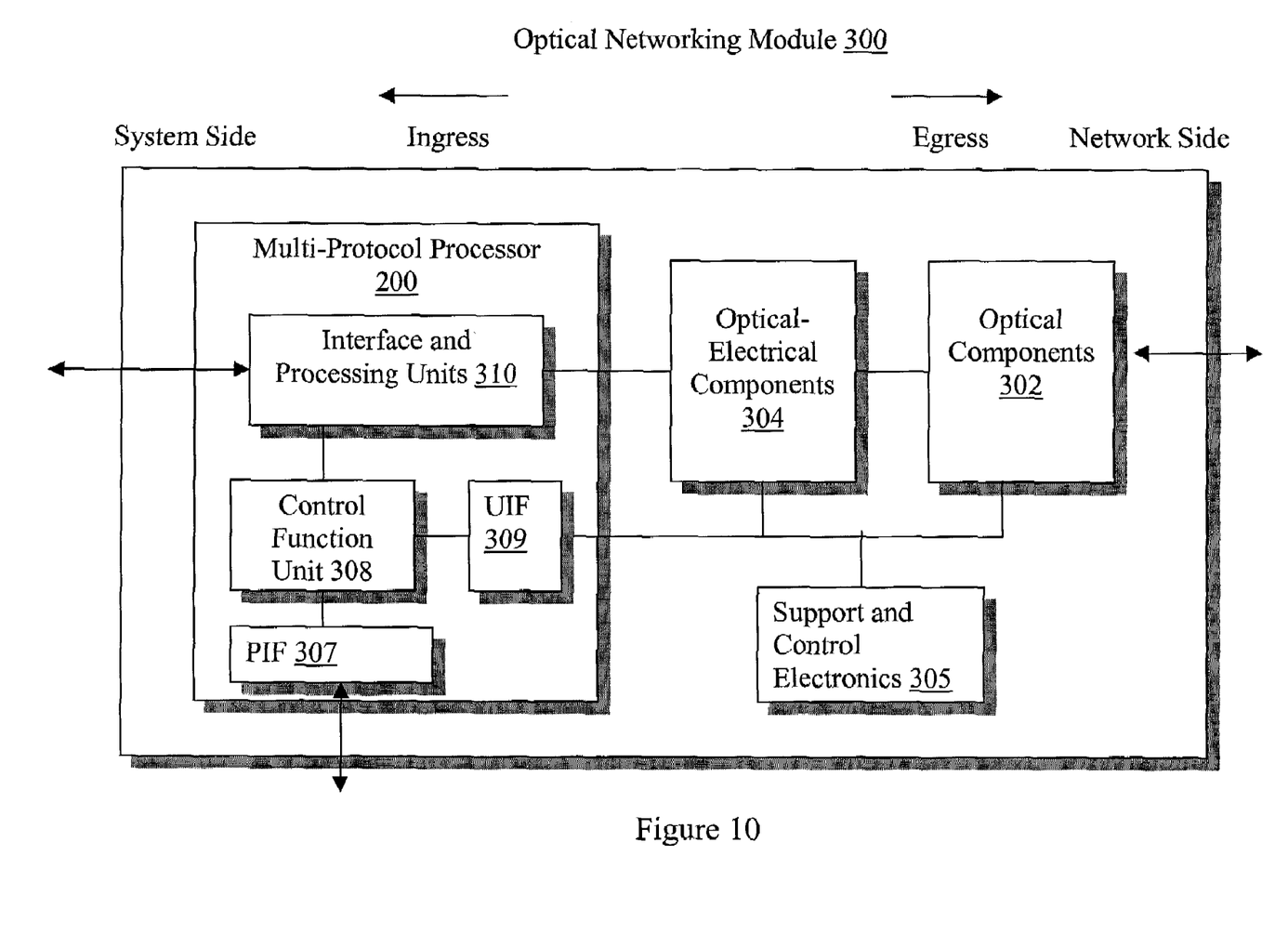
FIG. 10 illustrates an optical networking module incorporated with the multi-protocol processor of FIG. 9, in accordance with another example application.

FIG. 10 illustrates a further exemplary application of the present invention. Illustrated in FIG. 10 is integrated optical networking module 300 incorporated with multi-protocol processor 200 of FIG. 9, which as described earlier is incorporated with the packet diversion and insertion teachings of the present invention. Optical networking module 300 includes optical components 302, optical-electrical components 304, support control electronics 305, and multi-protocol processor 200 of FIG. 9, coupled to each other as shown. As described earlier, multi-protocol processor 200 includes in particular, a number of interfaces and processing units, collectively referenced as reference number 310, control function unit 308, processor interface 307 and utility interface 309 coupled to each other and components 302-304 as shown.

Optical components 302 are employed to facilitate the sending and receiving of optical signals encoded with data transmitted in accordance with a selected one of a plurality of protocols known in the art. Optical-electrical components 304 are employed to encode the egress data onto the optical signals, and decode the encoded ingress data. As described earlier, in a presently preferred embodiment, the support datacom and telecom protocols include but are not limited to SONET/SDH, 10Gbase-LR, 10Gbase-LW, Ethernet on SONET, Packet on SONET, and so forth. Support control electronics 305 are employed to facilitate management of the various aspects of optical components 302 and optical-electrical components 304. As described earlier, multi-protocol processor 200 is employed to perform data link and physical sub-layer processing on the egress and ingress data in accordance with a selected one of a plurality of supported datacom/telecom protocols, and to facilitate management of the multi-protocol processor 200 itself and optical, optical-electrical components 302 and 304 (through support control electronics 305).

In a presently preferred embodiment, optical components 302, optical-electrical components 304, support control electronics 305 and multi-protocol processor ASIC 200 are encased in a body (not shown) forming a singular optical networking module, with provided software forming a singular control interface for all functionality. That is, in addition to being equipped to provide optical to electrical and electrical to optical conversions, clock and data recovery, and so forth, integrated optical networking module 300 is also equipped to provide data link and physical sub-layer processing on egress and ingress data selectively for a number of protocols.

Further, in the preferred embodiment, control function unit 308 also includes control features, i.e. control registers and the like (not shown), in conjunction with support control electronics 305 to support a number of control functions for managing optical components 302, optical-electrical components 304 as well as multi-process protocol ASIC 200. Processor interface 307 is employed to facilitate provision of control specifications to control function unit 308, whereas utility interface 309 (a digital interface) is employed to facilitate management of components 302 and 304 by control function unit 308 (by way of support control electronics 305). The complementary control functions are placed with an embedded processor of optical networking equipment employing integrated optical network module 300. That is, integrated optical networking module 300 advantageously presents a singular unified software interface to optical networking equipment designers and developers to manage configuration and operation of the optical and electrical components, as well as protocol processing. As those skilled in the art would appreciate, as a result, the complexity of designing optical networking equipment, such as optical-electrical routers, switches, and the like, is reduced.

Optical networking module 300 is the subject matter of co-pending application entitled "Optical Networking Module", having at least partial common inventorship and filed May 18, 2001. The co-pending application is hereby fully incorporated by reference.

Conclusion and Epilogue

Thus, it can be seen from the above descriptions, a novel packet diversion and insertion approach, including packet flushing, that is more scalable and suitable for modern high speed networking, in particular, for efficient network trafficking that spans local, regional, and wide area networks in support of multiple datacom and telecom protocols has been described. While the present invention has been described in terms of the foregoing embodiments, those skilled in the art will recognize that the invention is not limited to these embodiments. The present invention may be practiced with modification and alteration within the spirit and scope of the appended claims. Thus, the description is to be regarded as illustrative instead of restrictive on the present invention.

What is claimed is:

1. A networking apparatus comprising:
a switching fabric including a plurality of ingress/egress points to switch routing paths of packets received through mediums coupled to the ingress/egress points;
a first buffering structure, coupled to a first one of said ingress/egress points and a first one of said mediums, including a first First In First Out (FIFO) storage structure to stage a first plurality of egress packets, and packet diversion and insertion logic to enable post-switching pre-medium diversion and insertion of egress packets on the first one of said mediums;
a second buffering structure, coupled to a second one of said ingress/egress points and a second one of said mediums, including a second FIFO storage structure to stage a second plurality of egress packets, and packet diversion and insertion logic to enable post-switching pre-medium diversion and insertion of egress packets on the second one of said mediums; and
egress packet write drop logic, which, in response to an overflow condition of said first FIFO storage structure, while operating under first protocol, writes an End of Packet (EOP) at an offset from a Start of Packet (SOP) location of an egress packet to be dropped, to effectuate a tail flush of said first FIFO storage structure.

2. The apparatus of claim 1, wherein said egress packet write drop logic, which, in response to an overflow condition of said first FIFO storage structure while operating under a first protocol,
reloads a write pointer associated with the first FIFO storage structure to point to a location in the first FIFO storage structure that is of a predetermined offset from a location pointed to by a read pointer associated with the first FIFO storage structure, and
writes an EOP at the location being pointed to by the reloaded write pointer, to effectuate a tail flush of said first FIFO storage structure.

3. The apparatus of claim 2, wherein said egress packet write drop logic further sets a bad egress packet bit to denote for a downstream processor that an immediately preceding egress packet was aborted, while writing an EOP at the location being pointed to by the reloaded write pointer.

4. The apparatus of claim 1, further comprising a processor interface coupled to each of the first and the second buffering structures, to respectively enable communication between the first and the second buffering structures and a first and second processor.

5. The apparatus of claim 4, wherein said first and second processors comprise Application Specific Integrated Circuits (ASICs).

6. The apparatus of claim 1, wherein said diversion and insertion are performed during data link/physical layer processing of egress packets.

7. The apparatus of claim 6, wherein said diversion and insertion and said data link/physical layer processing of egress packets are performed by a single Application Specific Integrated Circuit (ASIC).

8. The apparatus of claim 1, further comprising egress packet read drop logic, which, in response to an underflow condition of said first FIFO storage structure, while operating under a first protocol, multiplexes an EOP into said first plurality of egress packets to denote to a downstream processor that a current egress packet is bad, to effectuate a head flush of said first FIFO storage structure.

9. A networking apparatus comprising:
a switching fabric including a plurality of ingress/egress points to switch routing paths of packets received through mediums coupled to the ingress/egress;
a first buffering structure, coupled to a first one of said ingress/egress points and a first of said mediums, including a first First In First Out (FIFO) storage structure to stage a first plurality of ingress packets, and packet diversion and insertion logic to enable post-medium extraction, pre-switching diversion and insertion of egress packets on the first one of said mediums; and
a second buffering structure, coupled to a second one of said ingress/egress points and a second of said mediums, including a second FIFO storage structure to stage a second plurality of ingress packets, and packet diversion and insertion logic to enable post-medium extraction, pre-switching diversion and insertion of egress packets on the second one of said mediums; and
ingress packet write drop logic, which, in response to an overflow condition of said third FIFO storage structure, while operating under a first protocol, writes an End of Packet (EOP) at an offset from a Start of Packet (SOP) location of an ingress packet to be dropped, to effectuate a tail flush of said first FIFO storage structure.

10. The apparatus of claim 9, wherein said ingress packet write drop logic, which, in response to an overflow condition of said first FIFO storage structure while operating under a first protocol, reloads a write pointer associated with the first FIFO storage structure to point to a location in the first FIFO storage structure that is of a predetermined offset from a location pointed to by a read pointer associated with the first FIFO storage structure, and writes an EOP at the location being pointed to by the reloaded write pointer, to effectuate a tail flush of said first FIFO storage structure.

11. The apparatus of claim 10, wherein said ingress packet write drop logic further sets a bad ingress packet bit to denote for a system-side interface that an immediately preceding ingress packet was aborted, while writing an EOP at the location being pointed to by the reloaded write pointer.

12. The apparatus of claim 9, further comprising a processor interface coupled to each of the first and the second buffering structures, to respectively enable communication between the first and the second buffering structures and a first and second processor.

13. The apparatus of claim 9, wherein said first and second processors comprise Application Specific Integrated Circuits (ASICs).

14. The apparatus of claim 9, wherein said diversion and insertion are performed during data link/physical layer processing of ingress packets.

15. The apparatus of claim 9, further comprising ingress packet read drop logic, which, in response to an underflow condition of said first FIFO storage structure, while operating under a first protocol, multiplexes an EOP into said first plurality of ingress packets to denote a system-side interface that a current ingress packet is bad, to effectuate a head flush of said first FIPO storage structure.

16. The apparatus of claim 9, wherein said diversion and insertion and said data link/physical layer processing of ingress packets are performed by a single Application Specific Integrated Circuit (ASIC).

17. A networking apparatus comprising:

a switching fabric including a plurality of ingress/egress points to switch packets received through mediums coupled to the ingress/egress points; and a buffering structure including a first First In First Out (FIFO) storage structure, coupled to a first of said ingress/egress points and a first of said mediums, to stage a first plurality of ingress packets, and packet diversion and insertion logic to enable post-medium extraction, pre-switching diversion and insertion of egress packets on the first one of said mediums, and to enable post-switching pre-medium diversion and insertion of egress packets on the first one of said mediums; and egress packet write drop logic, which, in response to an overflow condition of said first FIFO storage structure, while operating under a first protocol, writes an End of Packet (EOP) at an offset from a Start of Packet (SOP) location of an egress packet to be dropped, to effectuate a tail flush of said first FIFO storage structure.

18. The apparatus of claim 17, further comprising a processor interface coupled to each of the first and the second buffering structures, to respectively enable communication between the first and the second buffering structures and a first and second processor.

19. The apparatus of claim 17, wherein said diversion and insertion are performed during data link/physical layer processing of egress packets.

20. The apparatus of claim 19, wherein said diversion and insertion and said data link/physical layer processing of egress packets are performed by a single Application Specific Integrated Circuit (ASIC).

21. The apparatus of claim 17, wherein said diversion and insertion are performed during data link/physical layer processing of ingress packets.

22. The apparatus of claim 17, wherein said diversion and insertion and said data link/physical layer processing of ingress packets are performed by a single Application Specific Integrated Circuit (ASIC).

* * * * *

UNITED STATES PATENT AND TRADEMARK OFFICE
CERTIFICATE OF CORRECTION

PATENT NO. : 7,646,782 B1  Page 1 of 1
APPLICATION NO. : 09/918931
DATED : January 12, 2010
INVENTOR(S) : Primrose et al.

It is certified that error appears in the above-identified patent and that said Letters Patent is hereby corrected as shown below:

Column 16, line 57, "of said mediums; and" should read --of said mediums;--.

Column 18, lines 25-26 "coupled to each of the first and the second buffering structures" should read --coupled to each of the buffering structure and an additional buffering structure--.

Column 18, line 27, "between the first and the second buffering structures" should read --between the buffering structure and the additional buffering structure--.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,646,782 B1 |
| APPLICATION NO. | : 09/918931 |
| DATED | : January 12, 2010 |
| INVENTOR(S) | : Primrose et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2609 days.

Signed and Sealed this

Twenty-eighth Day of December, 2010

David J. Kappos
*Director of the United States Patent and Trademark Office*